United States Patent
Karaoguz et al.

(10) Patent No.: US 7,684,374 B2
(45) Date of Patent: Mar. 23, 2010

(54) HANDLING OF MULTIMEDIA CALL SESSIONS AND ATTACHMENTS USING MULTI-NETWORK SIMULCASTING

(75) Inventors: Jeyhan Karaoguz, Irvine, CA (US); James D. Bennett, San Clemente, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1124 days.

(21) Appl. No.: 11/094,045

(22) Filed: Mar. 30, 2005

(65) Prior Publication Data

US 2006/0034335 A1 Feb. 16, 2006

Related U.S. Application Data

(60) Provisional application No. 60/591,735, filed on Jul. 28, 2004, provisional application No. 60/591,847, filed on Jul. 28, 2004, provisional application No. 60/591,844, filed on Jul. 28, 2004, provisional application No. 60/591,841, filed on Jul. 28, 2004, provisional application No. 60/591,845, filed on Jul. 28, 2004, provisional application No. 60/591,843, filed on Jul. 28, 2004, provisional application No. 60/591,842, filed on Jul. 28, 2004.

(51) Int. Cl.
*H04W 4/00* (2006.01)

(52) U.S. Cl. .................. 370/338; 370/331; 370/329; 370/352; 370/401; 455/442; 455/417; 455/445; 455/552.1; 379/211.02

(58) Field of Classification Search ... 455/412.1–412.2, 455/417, 466, 415, 3.05–3.06, 442, 436, 455/552.1, 41.2, 445; 379/88.11–88.18, 379/211.02; 709/203–206; 370/352–356, 370/331, 338, 329, 401; 348/14.01–14.02, 348/14.09; 725/62
See application file for complete search history.

(56) References Cited

U.S. PATENT DOCUMENTS 4,424,418 A * 1/1984 Moore et al. ........... 379/204.01

(Continued)

*Primary Examiner*—Sharad Rampuria
(74) *Attorney, Agent, or Firm*—McAndrews, Held & Malloy, Ltd.

(57) ABSTRACT

A method and apparatus supporting the handling of multimedia information using simulcasting using a broadband access gateway are disclosed. A broadband access gateway supporting both a personal area network and a broadband network may receive multimedia information during exchanges between access devices over a wireless wide area network. The wireless wide area network may intercept multimedia information, and may, for example, determine that the access device of the recipient is incompatible with the multimedia information. The wide area network may then redirect the multimedia information to a broadband access gateway that may cause the storage of the received multimedia information. In another representative embodiment of the present invention, the wide area network may adapt intercepted multimedia information to be compatible with the access device of the recipient, and may also redirect the original intercepted multimedia information to a broadband access gateway. The broadband access gateway may then cause the original intercepted multimedia information to be stored for later access. A recipient of the multimedia attachment or information may be notified of the redirection of the multimedia attachment or information, and may retrieve the stored multimedia information using a wired or wireless access device.

42 Claims, 10 Drawing Sheets

U.S. PATENT DOCUMENTS

| | | | |
|---|---|---|---|
| 4,893,335 A * | 1/1990 | Fuller et al. | 379/200 |
| 5,539,744 A * | 7/1996 | Chu et al. | 370/397 |
| 5,544,163 A * | 8/1996 | Madonna | 370/352 |
| 5,633,868 A * | 5/1997 | Baldwin et al. | 370/331 |
| 5,664,007 A * | 9/1997 | Samadi et al. | 455/442 |
| 5,742,905 A * | 4/1998 | Pepe et al. | 455/461 |
| 5,875,240 A * | 2/1999 | Silverman | 379/142.07 |
| 6,219,694 B1 * | 4/2001 | Lazaridis et al. | 709/206 |
| 6,614,781 B1 * | 9/2003 | Elliott et al. | 370/352 |
| 6,678,361 B2 * | 1/2004 | Rooke et al. | 379/93.24 |
| 6,725,044 B2 * | 4/2004 | Verma et al. | 455/444 |
| 6,731,625 B1 * | 5/2004 | Eastep et al. | 370/352 |
| 6,937,713 B1 * | 8/2005 | Kung et al. | 379/211.02 |
| 6,947,738 B2 * | 9/2005 | Skog et al. | 455/426.1 |
| 7,002,995 B2 * | 2/2006 | Chow et al. | 370/485 |
| 7,046,269 B2 * | 5/2006 | Parker et al. | 348/14.08 |
| 7,113,775 B2 * | 9/2006 | Punjabi | 455/417 |
| 7,206,809 B2 * | 4/2007 | Ludwig et al. | 709/204 |
| 7,379,455 B2 * | 5/2008 | Pickett | 370/389 |
| 7,395,065 B2 * | 7/2008 | Dorenbosch | 455/436 |
| 7,451,921 B2 * | 11/2008 | Dowling et al. | 235/380 |
| 7,457,280 B2 * | 11/2008 | Lindquist et al. | 370/352 |
| 7,546,125 B2 * | 6/2009 | Sharma et al. | 455/436 |
| 2002/0085516 A1 * | 7/2002 | Bridgelall | 370/329 |
| 2003/0134638 A1 * | 7/2003 | Sundar et al. | 455/435 |
| 2004/0023669 A1 * | 2/2004 | Reddy | 455/456.1 |
| 2006/0029050 A1 * | 2/2006 | Harris et al. | 370/356 |
| 2008/0002820 A1 * | 1/2008 | Shtiegman et al. | 379/211.02 |
| 2009/0170557 A1 * | 7/2009 | Chauhan et al. | 455/552.1 |

* cited by examiner

HANDLING OF MULTIMEDIA CALL SESSIONS AND ATTACHMENTS USING MULTI-NETWORK SIMULCASTING

RELATED APPLICATIONS

The present application makes reference to, claims priority to, and claims the benefit of the following United States Provisional Patent Applications, the complete subject matter of each of which is hereby incorporated herein by reference, in its entirety.

| Ser. No. | Title | Date Filed |
|---|---|---|
| 60/591,735 | Method and System for Handoff Through Simulcasting | Jul. 28, 2004 |
| 60/591,847 | Method and System for Handling Calls Through Simulcasting | Jul. 28, 2004 |
| 60/591,844 | Method and System for Handling Multimedia Information Through Simulcasting | Jul. 28, 2004 |
| 60/591,841 | Method and System for Simulcasting or Multicasting Multimedia Information in a Broadband Wired and/or Wireless LAN or Personal Area Network (PAN) Via a Broadband Access Gateway | Jul. 28, 2004 |
| 60/591,845 | Method and System for Consuming Simulcasted and Multicasted Content in a PAN/WAN/WLAN Serviced by a Broadband Access Gateway | Jul. 28, 2004 |
| 60/591,843 | Method and System for Handoff of a Multimedia Stream by Sniffing | Jul. 28, 2004 |
| 60/591,842 | Method and System for Sniffing to Provide Association with a New Network | Jul. 28, 2004 |

The present application also makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/095,842, entitled "Registering Access Device Multimedia Content Via a Broadband Access Gateway", filed Mar. 30, 2005, the complete subject matter of which is hereby incorporated herein by reference, in its entirety.

The present application also makes reference to U.S. patent application Ser. No. 11/095,638, entitled "Distributed Storage And Aggregation Of Multimedia Information Via a Broadband Access Gateway", filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

A user of a wired or wireless device may send multimedia information to the wireless mobile device of another party, assuming that the other party has the ability to make use of such information. The other party may find that their mobile device is incompatible with the multimedia information sent to them, or may be unwilling to pay for the costs of wireless delivery to their mobile device. Although the multimedia information may be important to the recipient, a user of a wireless mobile device typically has limited means to save multimedia attachments and information.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method handling multimedia information through multi-network simulcasting, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the present invention relate to communication over a hybrid wired and wireless networks. More specifically, certain embodiments of the present invention relate to a method and system for handling multimedia information through simulcasting of wireless network traffic for an active subscriber from a wireless service provider servicing the active subscriber to a broadband wired and/or a wireless LAN, and/or PAN using a broadband access gateway.

An aspect of the present invention provides seamless merging of wide area networks (WANs), from any kind of wired and/or wireless wide area networks, to pockets of wired and/or wireless local area networks (LANs) and personal area network (PANs), which may be located in homes or other environment such as an office or business. The merging of these various types of networks enables transparent communication of all types of media between access devices, which may be wired or wirelessly coupled to one or more of these networks. Seamless communication may be provided to access devices as they transition from one type of network to another type of network.

Figure 1:
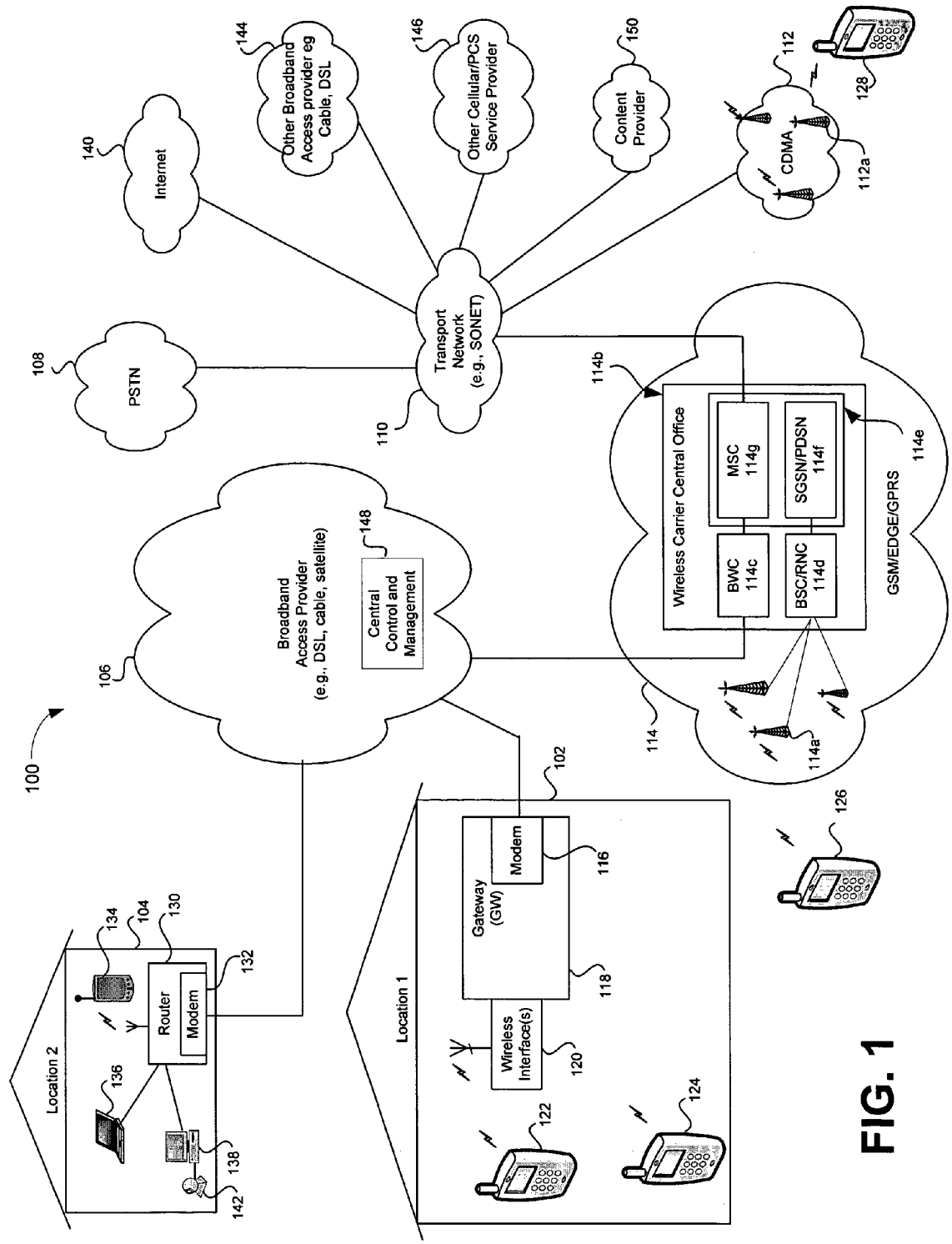
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, a public switched telephone network (PSTN) 108, a transport network 110, wireless service provider networks including a CDMA network 112 and a GSM/EDGE/GPRS network 114, and access devices 122, 124, 126, and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning, service management, and accounting. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM/EDGE/GPRS network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM/EDGE/GPRS networks 112, 114 may comprise a plurality of cell sites (a/k/a cellular towers) that are located in geographical cells within each of the networks. Within the GSM/EDGE/GPRS network 114, each of the cell sites such as, for example, cell site 114*a* may comprise a base transceiver station (BTS), and one or more base transceiver stations (BTSs) may be coupled to wireless carrier central office 114*b*. The wireless carrier central office 114*b* may comprise a base station controller/radio network controller (BSC/RNC) such as BSC/RNC 114*d*. One or more base station controllers/radio network controllers (BSCs/RNCs) may be coupled to the core network 114*e*, that comprises a network edge switch called a mobile switching center (MSC), such as MSC 114*g*, and a serving GPRS support node (SGSN)/packet data serving node (PDSN) 114*f*, of the GSM/EDGE/GPRS network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114*a* in GSM/EDGE/GPRS network 114 towards the wireless interface 120 in the first location 102, the call may be handed off from the cell site 114*a* of the GSM/EDGE/GPRS network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM/EDGE/GPRS network 114 via the broadband connection to the BAP 106 which is connected to the broadband wireless local area network controller (BWC) 114*c*.

In a representative embodiment of the present invention, voice and data traffic related to an existing active wireless call or connection for a subscriber may be routed from a serving wireless service provider such as, for example, the GSM/EDGE/GPRS network 114 to a broadband wired and/or a wireless WAN, LAN, and/or PAN using a broadband access gateway such as, for example, the gateway 118, so as to provide seamless handoff. The broadband wired and/or a wireless LAN (WLAN), and/or PAN using the broadband access gateway may be located in a home, for example. Simulcasting is the simultaneous broadcasting of the same information over two different communication paths or channels. Accordingly, in a representative embodiment of the present invention, voice and data related traffic may be simulcasted to an access device and to the home broadband access gateway upon initiation of a call, in addition to receipt of a call from a calling party. In the former case where a calling party places a call to a called party, related voice and data for the called party and/or the calling party may be communicated to the broadband access gateway 118. When the calling party is at home, the calling party may use their access device or some other access device that is now serviced by the broadband access gateway 118 for further communication.

With reference to FIG. 1, the access device 126 that may be, for example, a mobile multimedia handset, may initiate a call destined for the access device 128 that may also be, for example, a mobile multimedia handset. Once the call is setup and established, the mobile access device 126 may be serviced by a cell site such as, for example, the cell site 114*a* located in the GSM/EDGE/GPRS network 114, while mobile access device 128 may be serviced by a cell site such as, for example, the cell site 112*a* located in the CDMA network 112. While communication is active between the mobile access devices 126 and 128, the mobile access device 128 may send a multimedia attachment such as, for example, an MPEG video clip to the mobile access device 126. The user of the mobile access device 126 may accept the multimedia attachment for immediate viewing, or may re-route the multimedia attachment to the broadband access gateway 118 for storage, subsequent retrieval and playback.

In accordance with an embodiment of the invention, communications comprising multimedia attachments such as, for example, an MPEG video clip may be intercepted by the wireless carrier central office 114*b* and routed based on, for example, a default routing criteria or a predefined routing criteria that may be specified in, for example, a user profile. With regard to a default routing criteria, multimedia attachments that are, for example, less than a specified size may be sent to the mobile access device 126. However, multimedia attachments that are greater than or equal to the specified size may be routed, by the wireless carrier central office 114*b*, to the broadband access gateway 118, where it may be stored for subsequent retrieval. The default routing may be changed at anytime by an authorized user of an access device such as, for example, the mobile access device 126. Other routing criteria may be used including, for example, cost, delay, amount or size of the information exchanged, and type of the multimedia information.

A user profile comprising routing information and other user preferences information may also be utilized to route the multimedia information transferred during a communication session. Upon identifying a multimedia communication session or a communication session in which multimedia information is be transferred, the wireless carrier central office 114b may be adapted to consult the user profile to determine how the multimedia information is to be routed. An authorized user may change entries in the user profile, which define how multimedia information should be routed, at any time. Furthermore, entries in the user profile, which define how multimedia information should be routed, may be dependent on the capabilities of the access device being utilized. For example, although a user profile may specify that an MPEG video clip is to be routed to mobile access device 126, there may be insufficient memory available on the mobile access device 126 to facilitate immediate transfer of the MPEG video clip. Accordingly, the wireless carrier central office 114b may decide to route the MPEG video clip to the broadband access gateway 118, where it may be stored for subsequent retrieval and playback. In this case where multimedia information is rerouted, a notification may be sent to the mobile access device 126 informing a user of this access device that the multimedia information was rerouted because it was determined that there was insufficient memory on the mobile access device 126 to facilitate playback thereon.

The wireless carrier central office 114b may incorporate one or more network filters that may be adapted to identify multimedia information being transferred during a communication session. Once the network filter identifies the multimedia information that is being transferred, the multimedia information may be routed based on a default routing criterion or routing criteria specified in a user profile.

The user profile may comprise information that defines, for example, how audio files are to be routed, how emails are to be routed, how spreadsheets are to be routed, how still images (JPEG) are to be routed, etc., and the type of quality of service (QoS) that may be required. There may be different tiers of service that may be tied to different QoS. For example, a first user may stipulate in their profile that JPEG files are to be routed in their highest resolution and as such, will be billed for a higher tier of service. A second user may stipulate in their profile that JPEG files should be routed in their lowest resolution and as such, will be billed for a much lower tier of service. In cases where no specific routing criterion is defined, then multimedia information may be routed based on default routing criteria. Notwithstanding, other exemplary routing may comprise: transferring the multimedia information to both the mobile access device and to the broadband access gateway 118, and prompting a user of the mobile access device 126 to select or otherwise specify a destination for routing the multimedia information.

In another representative embodiment of the present invention, multimedia information may be routed based on specific quality of service (QoS). For example, multimedia information such as an MP3 audio clip may be transferred to the mobile access device 126 from the mobile access device 128. The MP3 audio clip delivered to the mobile access device 126 may be encoded at 92 kbps. However, the MP3 audio clip delivered to the broadband access gateway 118 may be encoded at 192 Kbps, thereby providing near CD quality audio. Different tiers of service may dictate the maximum amount of bandwidth that may be utilized to transfer multimedia information. In this regard, users in a particular tier may be capped at a specified bandwidth usage, except for users at the highest tier of service who may, for example, be allowed to utilize as much bandwidth as is available.

The wireless carrier central office 114b may be adapted to determine a tier of service for which a subscriber may have signed up and based on this determination, the wireless carrier central office 114b may be adapted to determine an optimal method for routing multimedia information via the wireless path provided by a wide area network (a/k/a, wireless service provider) such as, for example, the GSM/EDGE/GPRS network 114 and via a broadband access path such as, for example, the broadband connection supported by the modem 116 and BAP 106. Since the wireless path may have, for example, about 144 kbps of bandwidth and the broadband access path may possess, for example, about 1 Mbps of bandwidth, the resulting combined bandwidth may be utilized to more efficiently handle routing of multimedia information and/or other communication traffic. Accordingly, if the wireless carrier central office 114b determines that a particular mobile access device subscriber or user also has sufficient available bandwidth via a broadband access path, then the wireless carrier central office 114b may decide to route more data over the broadband access path in order to provide a higher QoS to the subscriber or user. In instances where a user may be roaming, for example, then a much lower QoS may be provided via the wide area network wireless path, but a much higher QoS may be provided via the broadband access path. Based on combined bandwidth resources, the wireless carrier central office 114b may make QoS decisions for the routing or delivery of traffic to both the broadband access gateway and the mobile access device.

Figure 2:
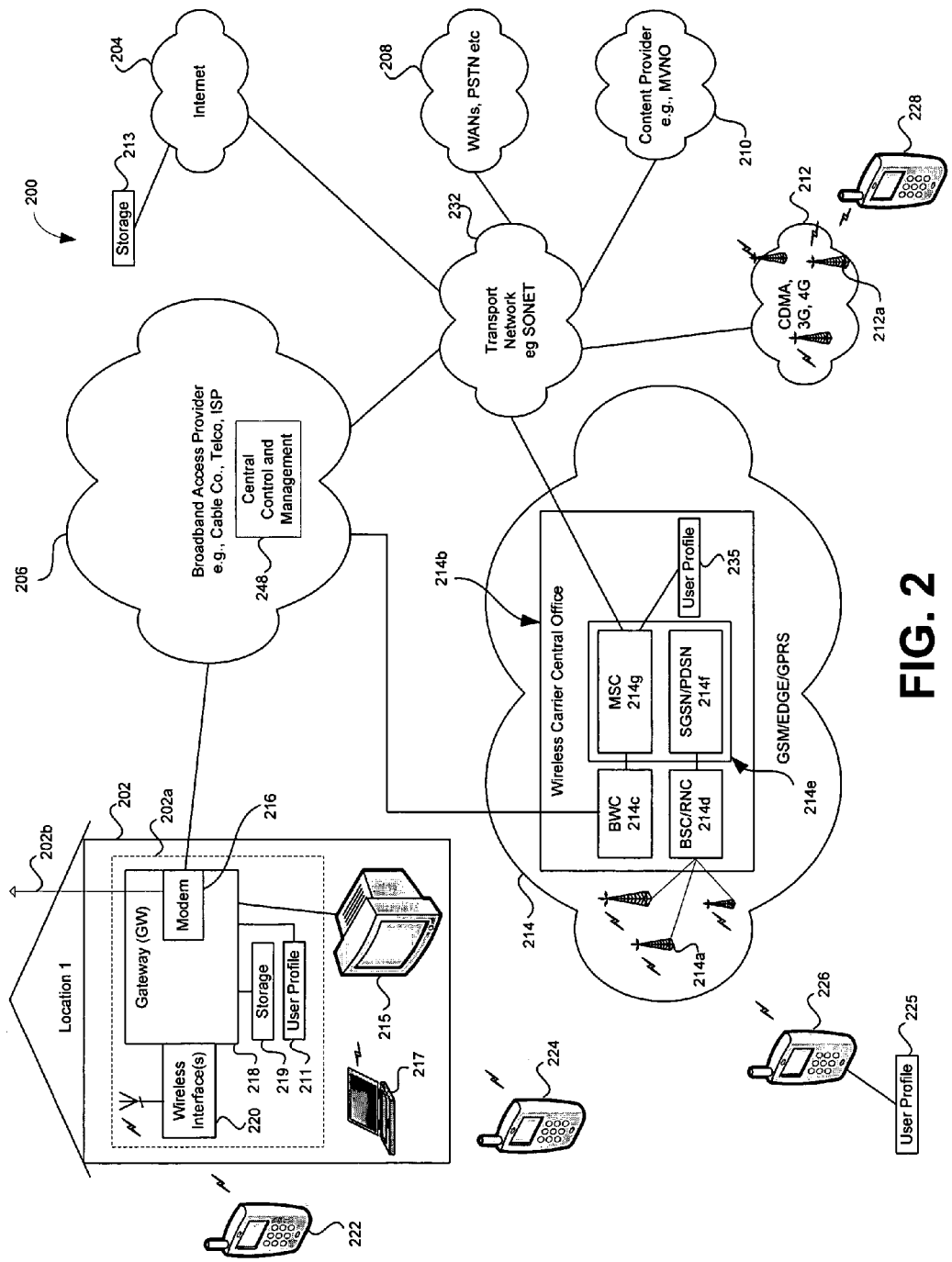
FIG. 2 shows a block diagram illustrating an exemplary communication system that may be utilized for handling multimedia information through simulcasting, in accordance with a representative embodiment of the present invention.

FIG. 2 shows a block diagram illustrating an exemplary communication system 200 that may be utilized for handling multimedia information through simulcasting, in accordance with a representative embodiment of the present invention. The exemplary communication system 200 of FIG. 2 provides handoff through simulcasting for wireless network traffic, for an active subscriber, from a wireless service provider servicing the active subscriber to a broadband wired and/or a wireless LAN, and/or PAN using a broadband access gateway. Referring to FIG. 2, there is shown a first location 202, a broadband access provider (BAP) 206, a transport network block 232, an Internet 204, a WANs, PSTN, etc networks block 208, a content providers block 210, wireless wide area service provider networks 212, 214, and a plurality of mobile access devices 222, 224, 226, 228 The wireless interface 220, the gateway 218 with modem 216, BAP 206, the GSM/EDGE/GPRS network 214, the transport network 232, and the CDMA network 236 of FIG. 2 may correspond, for example, to the wireless interface 120, the gateway 118 with modem 116, the BAP 106, the GSM/EDGE/GPRS network 114, the transport network 110, and the CDMA network 112, respectively, of FIG. 1. The illustration of FIG. 2 also comprises a central control and management block 248 that may correspond, for example, to the central control and management block 148 of FIG. 1.

The first location 202 comprises a broadband access gateway 218 with a modem 216, and a wireless interface 220. The first location may be a home, and the broadband access gateway 218 with the modem 216 and the wireless interface 220 may support a personal area network (PAN) and/or wireless local area network (WLAN), and may be referred to as a home network 202a. The wireless interface 220 may comprise a plurality of interfaces such as a Bluetooth interface, an IEEE 802.15.3a ultra-wideband interface, and any combination of IEEE 802.11a, b, g and/or n interfaces. The gateway 218 shown in FIG. 2 also comprises a user profile 211 and a storage 219. In a representative embodiment of the present invention, the gateway 218 may comprise, for example, a set top box that may be coupled in a wireless or wired fashion to access devices such as, for example, a laptop computer or television, such as the laptop 217 and the television 215 of FIG. 2. Service may be provided to the home network 202a supported by the gateway 218 via the cable modem 216, which is coupled to the broadband access provider 206.

The broadband access provider 206 may be, for example, a cable company, telephone company (Telco), or an Internet service provider (ISP). The broadband access provider 206 may utilize any of the standardized formats such as DOCSIS, digital subscriber line (DSL), or local multipoint distribution system (LMDS). LMDS utilizes broadband wireless technology to deliver voice, video, data, and/or Internet services utilizing licensed or unlicensed spectrum in the frequency range of 25 GHz and higher. LMDS utilizes point-to-point or point-to-multipoint communication to provide broadband services, some of which rely on line of sight (LOS). LMDS is a fixed wireless solution, and as such, no mobility support is required.

The broadband access provider 206 may be also be a WiMAX or Institute of Electronic and Electrical Engineers, Inc. (IEEE) 802.16-compliant service provider. The IEEE 802.16 standard offers a wireless metropolitan area network (MAN) air interface which provides network access to buildings via external antennas that receive signals from a remotely located central base station. The signal received at the building may be communicated to a wired network infrastructure such as an IEEE 802.3 compliant communication network or a wireless network infrastructure such as an IEEE 802.11a/b/g and/or n-compliant network. In instances where WiMAX is utilized, then antenna 202b may be utilized to receive and transmit signals between the broadband access provider 206 and the home network 202a.

The WANs, PSTN, etc networks block 208 may comprise networks such as private or public communication networks. For example, the WANs, PSTN, etc networks block 208 may comprise a public switched telephone network (PSTN) and a packet network such as a cellular digital packet data (CDPD) network.

The content providers block 210 may comprise network providers, which supply data and/or multimedia content. In a representative embodiment of the present invention, the content providers block 210 may comprise one or more mobile virtual network operators (MVNOs). A MVNO is a mobile service provider that provides mobile services to its subscribers by utilizing the network infrastructure of another company. In this regard, the MVNO enters into an agreement with a network operator to purchase network time such as minutes, which it resells to it own customers/subscribers. The MNVO utilizes the purchased time to provide, for example, multimedia content delivery to its subscribers.

The wireless service provider network 212 may, for example, utilize CDMA, 3G or 4G access technology and may comprise a plurality of cell sites. Cell site 212a may provide cellular service to the mobile access device 228 while the mobile access device 228 is within range of the cell site 212a. The wireless service provider network 214 may, for example, utilize the time division multiple access (TDMA) access technology of the GSM standard, and may include enhanced data rates for GSM evolution (EDGE) and/or general packet radio service (GPRS) data capability. The wireless service provider network 214 may comprise a plurality of cell cites and a wireless carrier central office 214b, the latter of which comprises a mobile switching center (MSC) 214g. Cell site 214a may provide cellular service to mobile access device 226 while the mobile access device 226 is within range of the cell site 214a. The wireless carrier central office 214b may also comprise a user profile 235.

With reference to FIG. 2, the mobile access device 226, which may be a mobile multimedia handset, for example, may initiate a call destined for the mobile access device 228. The mobile access device 228 may also be, for example, a mobile multimedia handset. Once the call is setup and established, the mobile access device 226 may be serviced by a cell site such as, for example, the cell site 214a located in the GSM network 214, while mobile access device 228 may be serviced by a cell site such as, for example, the cell site 212a located in the CDMA network 212. While communication is active between the mobile access devices 226 and 228, the mobile access device 228 may send a multimedia attachment such as, for example, an MPEG video clip to the mobile access device 226. The user of the mobile access device 226 may accept the multimedia attachment for immediate viewing, or may re-route the multimedia attachment to the broadband access gateway 218 for storage, subsequent retrieval and playback.

In accordance with a representative embodiment of the present invention, communications comprising multimedia attachments such as an MPEG video clip may be intercepted by the wireless carrier central office 214b and routed based on, for example, a default routing criteria or a predefined routing criteria that may be specified in, for example, a user profile. A suitable user profile may be available at a number of locations in the communication system 200 of FIG. 2 including, for example, the mobile access device 226 as user profile 225, at the wireless carrier central office 214b as user profile 235, and at the broadband access gateway 218 as user profile 211. Information from the user profile 225 of the mobile access device 226 may, for example, be communicated to the broadband access gateway 218, or to wireless carrier central office 214b, following registration of the mobile access device 226. A description of a suitable registration process may be found in U.S. patent application Ser. No. 11/095,842, entitled "Registering Access Device Multimedia Content Via a Broadband Access Gateway", filed Mar. 30, 2005, the complete subject matter of which is hereby incorporated herein by reference, in its entirety. User profile information may be provided to the wireless carrier central office 214b by the broadband access gateway 218 via the BAP 106.

With regard to a default routing criteria, multimedia attachments that are, for example, less than a specified size may be sent to the mobile access device 226. However, multimedia attachments that are greater than or equal to a specified size may be routed by the wireless carrier central office 214b to the broadband access gateway 218, where the multimedia attachments may be stored for subsequent retrieval in storage such as, for example, the storage 219. Appropriate storage may be available at other locations within the communication system 200 including, for example, the storage 213 accessible via the Internet 204. A description of a storage mechanism that may be employed by a representative embodiment of the present invention is described in U.S. patent application Ser. No. 11/095,638, entitled "Distributed Storage And Aggregation Of Multimedia Information Via a Broadband Access Gateway", filed Mar. 30, 2005, the complete subject matter of which is hereby incorporated herein by reference, in its entirety. In a representative embodiment of the present invention, the default routing may be changed at any time by an authorized user of an access device such as, for example, the mobile access device 226.

A user profile such as, for example, the user profile 225 of FIG. 2 that comprises routing information and other user preferences information may also be utilized to route the multimedia information transferred during a communication session. For example, upon identifying a multimedia communication session or a communication session in which multimedia information is being transferred, the wireless carrier central office 214b may be adapted to consult the user profiles 211, 225, 235 to determine how the multimedia information is to be routed. An authorized user may change entries in a user profile, which define how multimedia information should be routed, at any time. Furthermore, entries in a user profile that define how multimedia information should be routed may be dependent on the capabilities of the access device being utilized. For example, although a user profile may specify that an MPEG video clip is to be routed to mobile access device 226, there may be insufficient memory available on the mobile access device 226 to facilitate immediate transfer of the MPEG video clip. Accordingly, the wireless carrier central office 214b may decide to route the MPEG video clip to the broadband access gateway 218 where it may be stored for subsequent retrieval and playback on storage 219. The broadband access gateway 218 may also cause the multimedia information (e.g., the MPEG video clip) to be stored at another location accessible to the broadband access gateway 218 such as, for example, the storage 213. In this case where multimedia information is rerouted, a notification may be sent to the mobile access device 226 informing a user of this access device that, for example, the multimedia information was rerouted because it was determined that there was insufficient memory on the access device to facilitate playback thereon.

In a representative embodiment of the present invention, the wireless carrier central office 214b may incorporate one or more network filters that may be adapted to identify multimedia information being transferred during a communication session. Such filters may use, for example, statistical or content analysis of the multimedia information, or information about the communications path to determine the nature of the multimedia information. Once the network filter identifies the multimedia information that is being transferred, the multimedia information may be routed based on a default routing criterion or routing criteria specified in a user profile such as, for example, the user profiles 211, 225, 235.

Figure 3:
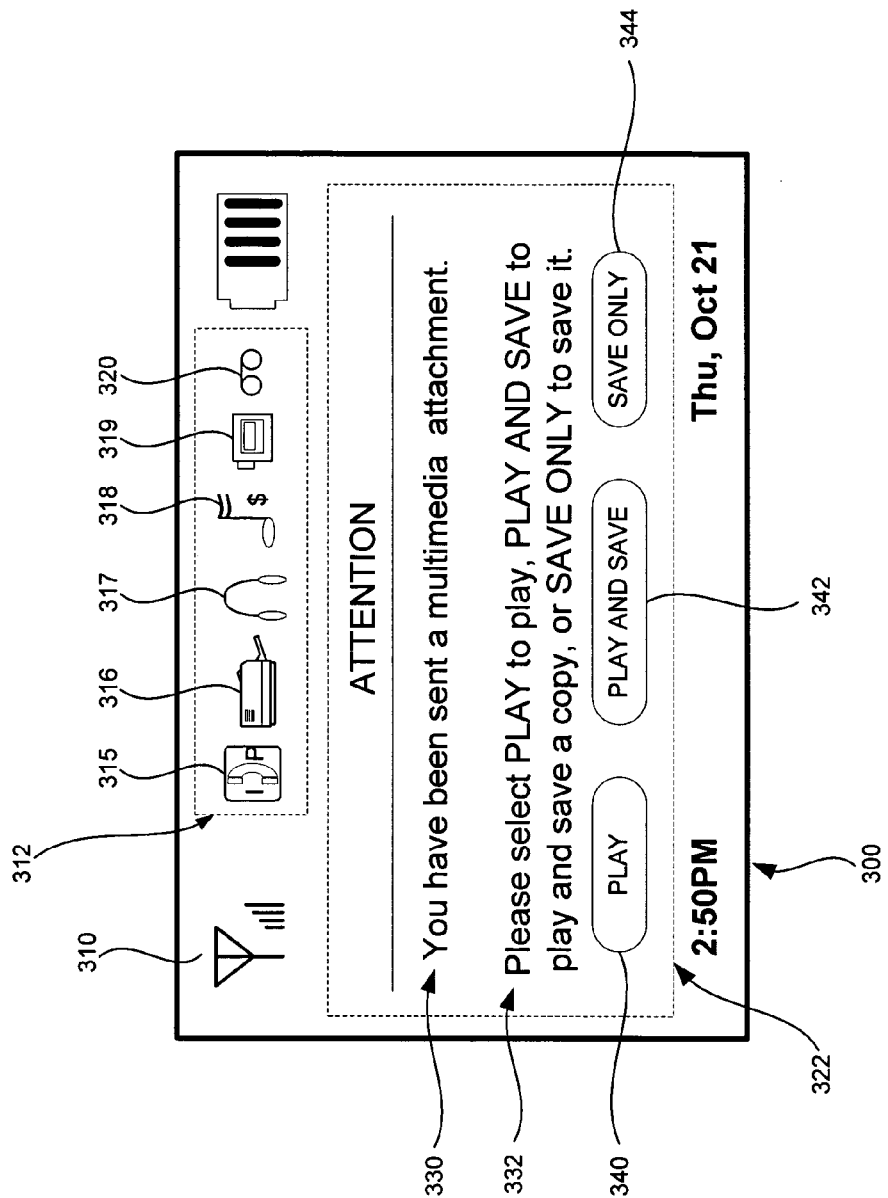
FIG. 3 illustrates a display showing an exemplary routing prompt screen that may be displayed by an access device that may correspond, for example, to one of the mobile access devices of FIG. 2, in accordance with a representative embodiment of the present invention.

FIG. 3 illustrates a display 300 showing an exemplary routing prompt screen 322 that may be displayed by an access device that may correspond, for example, to one of the mobile access devices 222, 224, 226, 228 of FIG. 2, in accordance with a representative embodiment of the present invention. The display 300 of FIG. 3 comprises a network indicator 310, a network services indicator area 312, a battery life indicator, a time of day indicator, and a day and date indicator. The network services indicator area 312 of FIG. 3 comprises an Internet protocol (IP) phone service icon 315, a printer service icon 316, a stereo entertainment icon 317, a pay music service icon 318, a video entertainment icon 319, and a call recording icon 320 showing those services that may be advertised by a broadband access gateway such as, for example, the gateway 218 of FIG. 2, as being available to an appropriately identified or authorized user of the access device. Further information about the advertising of multimedia information and media-related services by a broadband access gateway may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

In a representative embodiment of the present invention, the routing prompt screen 322 of FIG. 3 may be displayed, for example, upon arrival of a multimedia attachment at a wide area network such as, for example, the GSM/EDGE/GPRS network 214. The routing prompt screen 322 comprises reason text 330 informing the user of the access device of the arrival of the multimedia attachment, and prompt text 332 requesting that the user indicate whether the received multimedia attachment should be played, played and saved, or only saved. The routing prompt screen 322 also comprises a "PLAY" button 340 to be used to select playback of the multimedia attachment, a "PLAY AND SAVE" button 342 to request that the multimedia attachment be played for the user and saved in storage, and a "SAVE ONLY" button 344 to be used to select only storage of the multimedia attachment. Although the routing prompt screen 322 refers to the playing of the multimedia attachment, the approach illustrated in FIG. 3 may also be employed with those multimedia attachments that are viewed, used as input to software applications, etc. In addition, it should be noted that the illustration of FIG. 3 is for purposes of explanation, as other forms of user interface and/or arrangements of text, icons, etc., may be employed without departing from the spirit and scope of the present invention.

Figure 4:
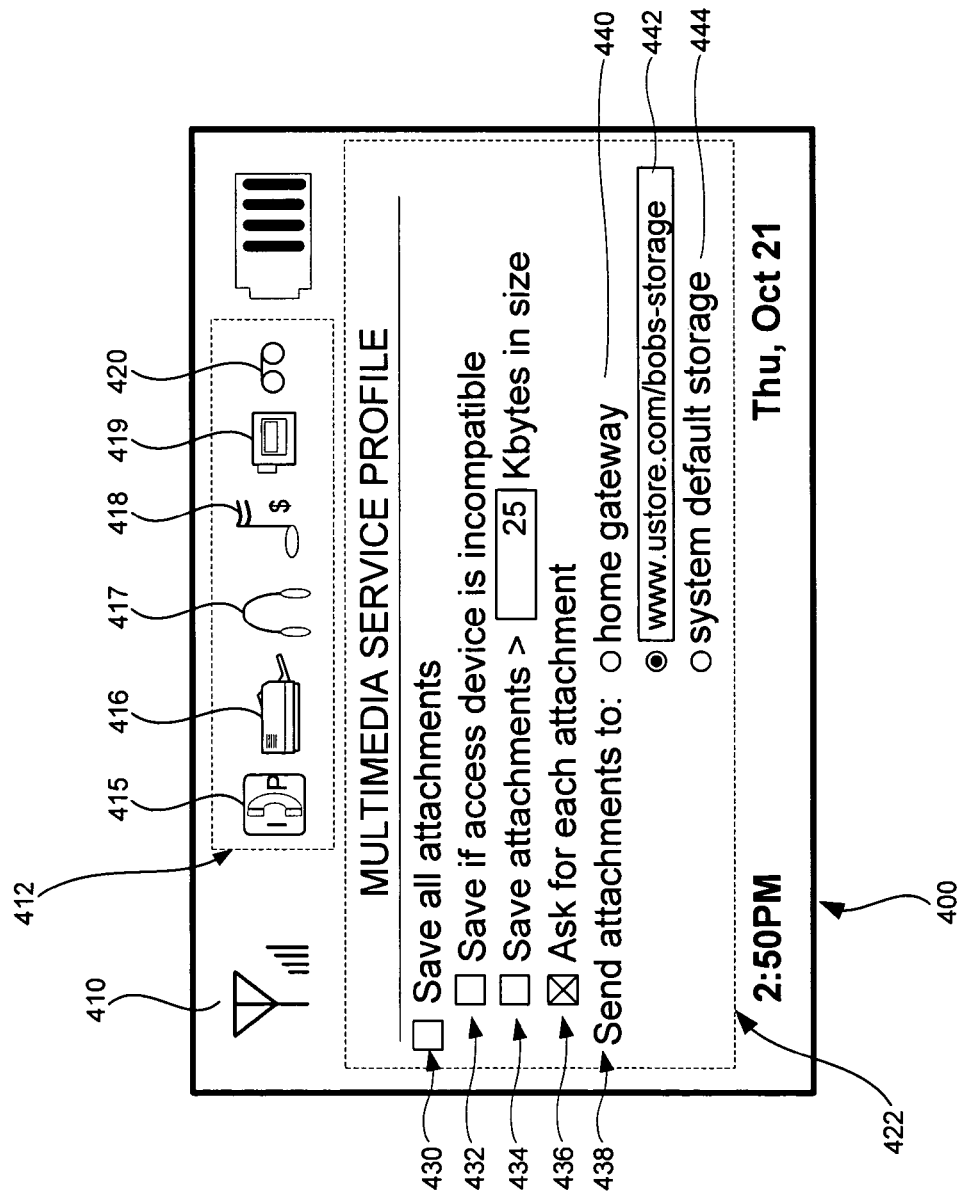
FIG. 4 illustrates an exemplary multimedia service user profile screen that may be used to define the handling of multimedia information and/or attachments in a communication system such as the communication system of FIG. 2 in accordance with a representative embodiment of the present invention.

FIG. 4 illustrates an exemplary multimedia service user profile screen 422 that may be used to define the handling of multimedia information and/or attachments in a communication system such as the communication system 200 of FIG. 2 in accordance with a representative embodiment of the present invention. The display 400 of FIG. 4 comprises a network indicator 410, a network services indicator area 412, a battery life indicator, a time of day indicator, and a day and date indicator. The network services indicator area 412 of FIG. 4 comprises an Internet protocol (IP) phone service icon 415, a printer service icon 416, a stereo entertainment icon 417, a pay music service icon 418, a video entertainment icon 419, and a call recording icon 420 showing those services that may be advertised by a broadband access gateway such as, for example, the gateway 218 of FIG. 2, as being available to an appropriately identified or authorized user of the access device. The multimedia service user profile screen 422 also comprises a number of options and entries that may be employed by a user to direct the manner in which multimedia attachments and/or the information of multimedia sessions is handled. A first check box 430 permits the user to stipulate that all multimedia attachments are to be saved. If check box 430 is selected, all attachments addressed to the associated access device may be stored at the location selected by the attachment destination parameter 438, either to storage on a home gateway that may, if button 440 is selected; to storage at the location defined by universal resource locator "www.ustore.com/bobs-storage", if button 442 is selected; or to the system default storage, if button 444 is selected.

If not all multimedia attachments are to be saved and the check box 430 is not selected, the user may indicate using check boxes 432, 434, 436 the conditions under which attachments are to be saved. For example, if check box 432 is checked, any multimedia attachments that are not compatible with the access device may be saved. Storage of the attachment may be in accordance with the destination parameter 438, described above. In a representative embodiment of the present invention, a wide area network such as, for example, the GSM/EDGE/GPRS network 214 may be aware of the capabilities of an access device such as, for example, the mobile access device 226 of FIG. 2 using identifying information received during registration, or when entering into communication with a broadband access gateway, as described above. Identifying information may comprise, for example, an electronic serial number, a member identifier, an administrative identifier, a media access control (MAC) address, an Internet protocol (IP) address, a credit card account identifier, and may comprise a digital certificate. If check box 434 is checked, multimedia attachments of greater than a predefined size, in this case 25 kilobytes, may be redirected to storage selected by the destination parameter 438. If the check box 436 is checked, a representative embodiment of the present invention may ask the user for storage instructions upon receipt of each attachment, such as the example illustrated in FIG. 3, above.

Figure 5:
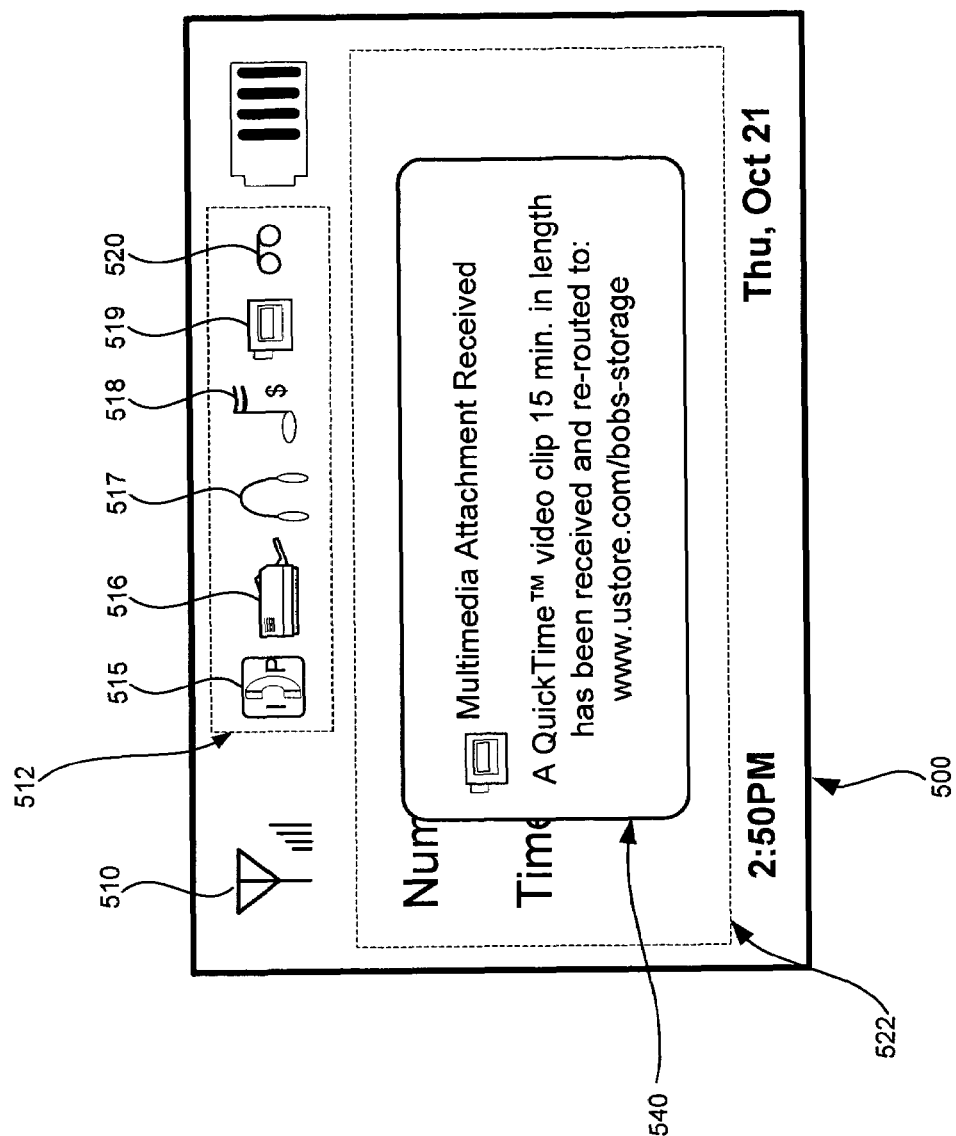
FIG. 5 illustrates a display showing a pop-up message that may be presented to a user of an access device that may correspond, for example, to one of the mobile access devices of FIG. 2, following automatic storage of a received multimedia attachment, in accordance with a representative embodiment of the present invention.

FIG. 5 illustrates a display 500 showing a pop-up message 540 that may be presented to a user of an access device that may correspond, for example, to one of the mobile access devices 222, 224, 226, 228 of FIG. 2, following automatic storage of a received multimedia attachment, in accordance with a representative embodiment of the present invention. The display 500 of FIG. 5 comprises a network indicator 510, a network services indicator area 512, a battery life indicator, a time of day indicator, and a day and date indicator. The network services indicator area 512 of FIG. 5 comprises an Internet protocol (IP) phone service icon 515, a printer service icon 516, a stereo entertainment icon 517, a pay music service icon 518, a video entertainment icon 519, and a call recording icon 520 showing those services that may be advertised by a broadband access gateway such as, for example, the broadband access gateway 218 of FIG. 2, as being available to an appropriately identified or authorized user of the access device. The pop-up message 540 may appear over other contents of the display area 522 when a multimedia attachment is received and automatically stored, as may occur when, for example, the check box 430 of the multimedia service user profile screen 422 of FIG. 4 is checked. The particular example, of FIG. 5 shows that a multimedia attachment comprising a QuickTime™ video clip is being stored at a storage resource having a universal resource locator of "www.ustore.com/bobs-storage". Other forms of messaging to a user, and means of saving a multimedia attachment other than those shown in FIG. 5 may be employed without departing from the spirit and scope of the present invention.

Figure 6:
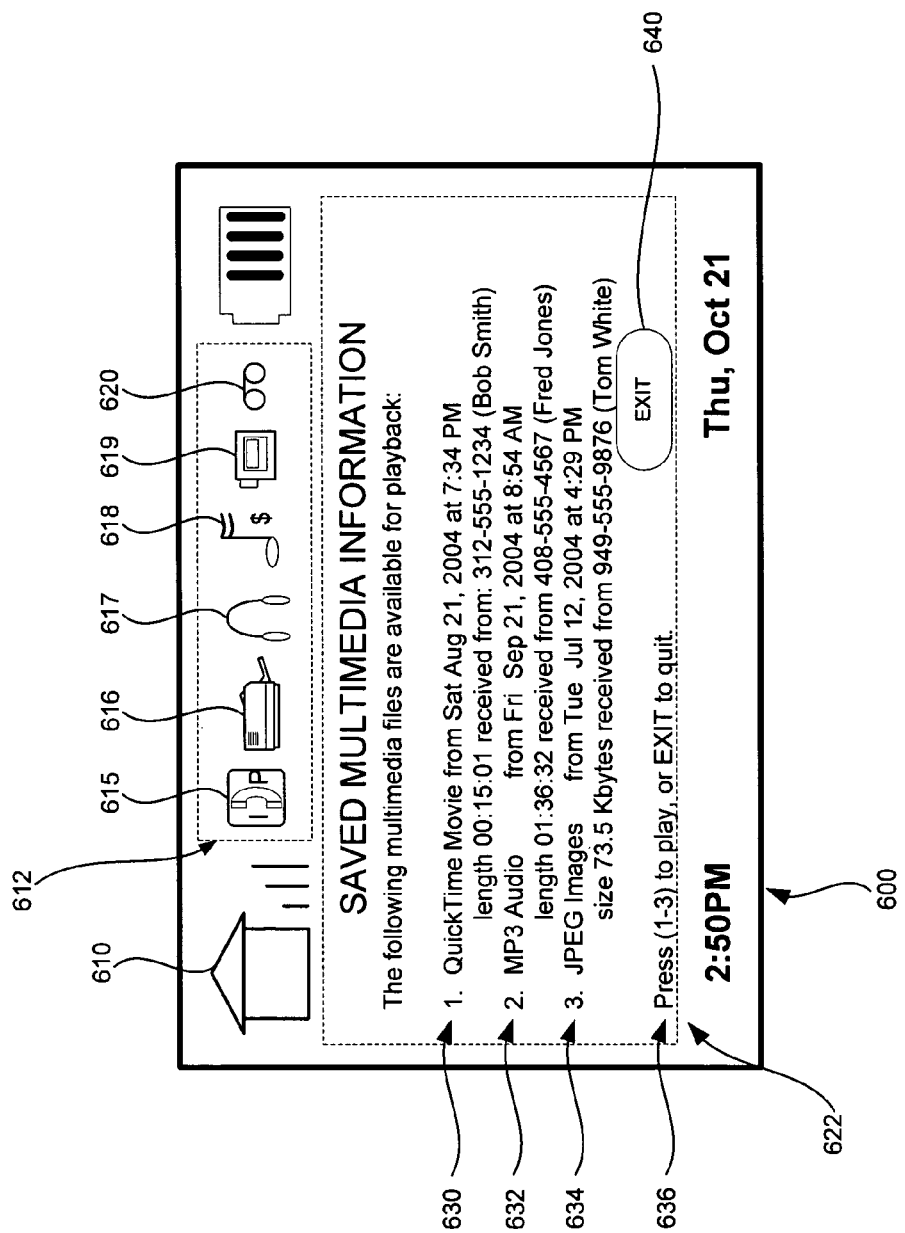
FIG. 6 illustrates a display showing a saved multimedia information screen that may be presented to a user of an access device that may correspond, for example, to one of the mobile access devices of FIG. 2, listing various stored multimedia attachments and/or information that are available, in accordance with a representative embodiment of the present invention.

FIG. 6 illustrates a display 600 showing a saved multimedia information screen 622 that may be presented to a user of an access device that may correspond, for example, to one of the mobile access devices 222, 224, 226, 228 of FIG. 2, listing various stored multimedia attachments and/or information that are available, in accordance with a representative embodiment of the present invention. The display 600 of FIG. 6 comprises a network indicator 610, a network services indicator area 612, a battery life indicator, a time of day indicator, and a day and date indicator. The network services indicator area 612 of FIG. 5 comprises an Internet protocol (IP) phone service icon 615, a printer service icon 616, a stereo entertainment icon 617, a pay music service icon 618, a video entertainment icon 619, and a call recording icon 620 showing those services that may be advertised by a broadband access gateway such as, for example, the broadband access gateway 218 of FIG. 2, as being available to an appropriately identified or authorized user of the access device. Although the multimedia information screen 622 displayed in FIG. 6 comprises textual information, other forms of presentation such as, for example, a graphical interface may be employed without departing from the scope and spirit of the present invention. The multimedia information screen 622 comprises a QuickTime™ movie clip entry 630 showing the date and time of receipt, the length of the stored information, and the source. The multimedia information screen 622 also lists an MP3 audio clip entry 632, and a JPEG still image entry 634 showing the date and time of receipt, the size of the stored image in kilobytes, and the source. A user of the access device reviewing the saved multimedia information screen 622 may press keys 1, 2, or 3, to play the corresponding multimedia item, or may exit the saved multimedia information screen 622 by clicking on the EXIT button 640. The saved multimedia information screen 622 may be displayed on an access device such as the mobile access device 226 of FIG. 2. Information such as that displayed in FIG. 6 may also be displayable on other access devices of the communication system 200 of FIG. 2 including, for example, the laptop 217 and the television 215, or the wireless PDA 134, the laptop 136, or personal computer (PC) 138 of FIG. 1.

Figure 7:
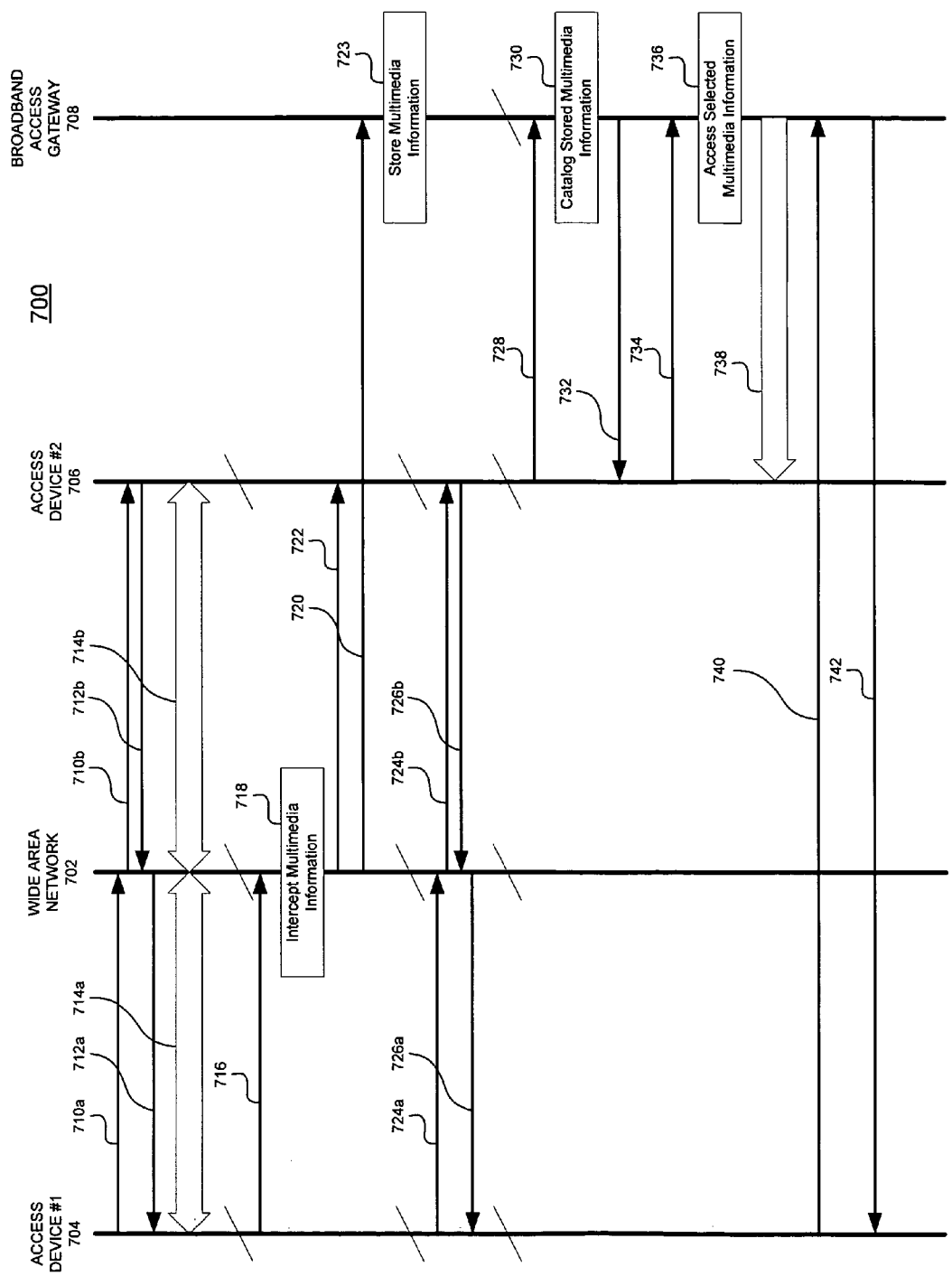
FIG. 7 is a message exchange diagram illustrating an exemplary exchange of messaging during a user call via a wide area network such as, for example, the GSM/EDGE/GPRS network, involving the storage of multimedia information via a broadband access gateway, in accordance with a representative embodiment of the present invention.

FIG. 7 is a message exchange diagram 700 illustrating an exemplary exchange of messaging during a user call via a wide area network such as, for example, the GSM/EDGE/GPRS network 214, involving the storage of multimedia information via a broadband access gateway, in accordance with a representative embodiment of the present invention. In the illustration of FIG. 7, the four vertical lines represent a wide area network 702, an access device #1 704, an access device #2 706, and a broadband access gateway 708 that may correspond to, for example, the GSM/EDGE/GPRS network 214, the access devices 226, 228, and the broadband access gateway 218, respectively, of FIG. 2. The horizontal lines represent message traffic or groups of messages exchanged between a source and a destination, the destination being indicated by the arrow head. The vertical dimension represents time, advancing downward on the message exchange diagram 700.

In a representative embodiment of the present invention, an access device #1 704 may initiate a call via the wide area network 702 using messaging 710a, 710b, 712a, 712b to the access device #2 706. The messaging 710a, 710b, 712a, 712b may comprise multiple messages for establishing a wireless call on the wide area network 702. In the illustration of FIG. 7, the wide area network 702 may activate paths 714a, 714b to transport voice signals between the access device #1 704, the wide area network 702, and the access device #2 706. At some point during the call, the user of the access device #1 704 may send a multimedia attachment 716 to the access device #2 706. In a representative embodiment of the present invention, the wide area network 702 may intercept 718 the multimedia attachment 716 in accordance with a user profile such as, for example, the user profile 235 of FIG. 2. The user profile 235 may designate that, for example, all multimedia attachments, or multimedia attachments larger than a certain size, or requiring certain access device capabilities be stored rather than communicated to the destination access device. The wide area network 702 may then redirect the intercepted multimedia attachment 716 to the designated storage such as, for example, the broadband access gateway 708 that may then perform a storage function 723. It should be noted that in a representative embodiment of the present invention, the broadband access gateway 708 may, for example, correspond to the broadband access gateway 218 of FIG. 2, and may store the multimedia attachment locally on the broadband access gateway 708, or may cause it to be stored at another location, depending upon the information in the user profile 235. At some later point in time, the user of access device #1 704 may choose to end the call, and may cause message 724a to be sent to the wide area network 702. The wide area network 702 may send message 724b to the access device #2 706, that may acknowledge with message 726b. The wide area network 702 may then acknowledge the request to end the call by replying to access device #1 with messaging 726a, ending the call.

Although the illustration of FIG. 7 shows the access device #1 704 originating and ending the call, a similar call scenario in accordance with a representative embodiment of the present invention may be employed when the call is ended by the called party.

At some point after the end of the call, the user of the access device #1 704 may wish to know what multimedia items have been stored on their behalf by the wide area network 702, and may cause a catalog request 728 to be sent to the designated location for multimedia storage as indicated in the user profile 235 such as, for example, the broadband access gateway 708. Upon receiving the catalog request 728, the broadband access gateway may activate functionality to catalog the stored multimedia information (730), and may return a listing of the available stored multimedia information in message 732. The user of the access device 704 may then select from the listed multimedia information, and may cause a message 734 to be sent to the broadband access gateway 708 to access selected multimedia information. The broadband access gateway 708 may then establish a communication path 738 to the access device #1 704, to deliver the selected multimedia information.

Figure 8:
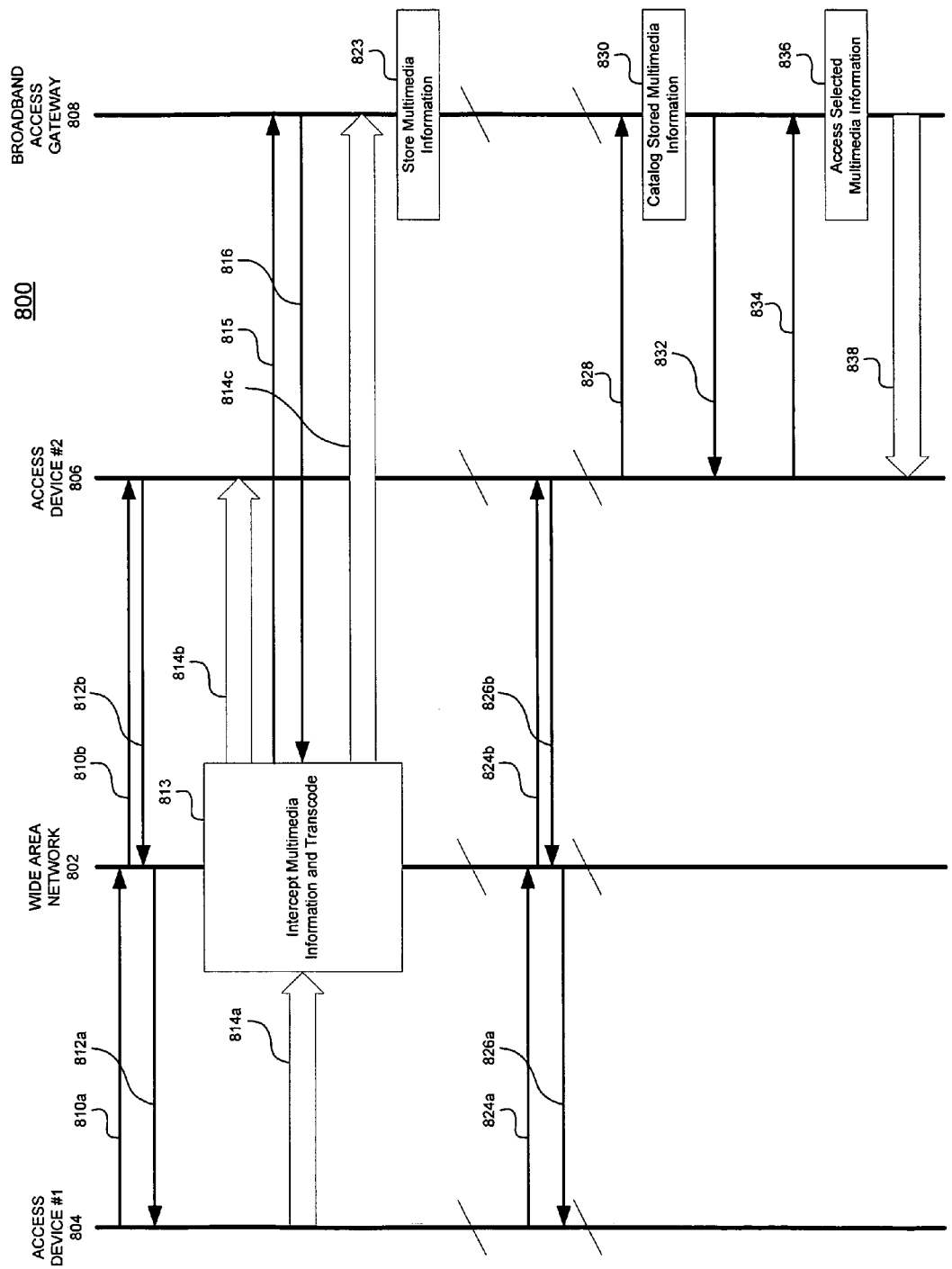
FIG. 8 is a message exchange diagram illustrating an exemplary exchange of messaging during a user call via a wide area network such as, for example, the GSM/EDGE/GPRS network, involving the simulcasting of multimedia information to a broadband access gateway, in accordance with a representative embodiment of the present invention.

FIG. 8 is a message exchange diagram 800 illustrating an exemplary exchange of messaging during a user call via a wide area network such as, for example, the GSM/EDGE/GPRS network 214, involving the simulcasting of multimedia information to a broadband access gateway, in accordance with a representative embodiment of the present invention. In the illustration of FIG. 8, the four vertical lines represent a wide area network 802, an access device #1 804, an access device #2 806, and a broadband access gateway 808 that may correspond to, for example, the GSM/EDGE/GPRS network 214, the access devices 226, 228, and the broadband access gateway 218, respectively, of FIG. 2. The horizontal lines represent message traffic or groups of messages exchanged between a source and a destination, the destination being indicated by the arrow head. The vertical dimension represents time, advancing downward on the message exchange diagram 800.

In a representative embodiment of the present invention, an access device #1 804 may initiate a call via the wide area network 802 using messaging 810a, 810b, 812a, 812b to the access device #2 806. The messaging 810a, 810b, 812a, 812b may comprise multiple messages for establishing a wireless call on the wide area network 802. In the illustration of FIG. 8, the messaging of wide area network 802 may activate a path to transport multimedia information stream 814a between access device #1 804 and access device #2 806 via the wide area network 802. The multimedia information stream may comprise, for example, audio information encoded at 192 kilobits per second. The wide area network 802 may recognize the capabilities of the destination access device #2 806 using, for example, information in a user profile or identifying information shared by the access device #2 806. The wide area network 802 may intercept the multimedia information stream 814a, and may employ functionality 823 to transcode the 192 kbps encoded audio stream 814a to a 92 kbps stream 814b suitable for use by the destination access device #2 806. In addition, the wide area network 802 may send message 815 to the broadband access gateway 808 to request storage of the intercepted multimedia information stream 814a (i.e., the 192 kbps encoded audio stream). Upon receiving an acknowledgement message 816 in response to the request, the wide area network 802 may forward the received audio stream 814 encoded at 192 kbps, to the broadband access gateway 808 as audio stream 814c. The broadband access gateway 808 may then cause the storage of the multimedia information (i.e., the audio stream) 814c using storage function 823. It should be noted that in a representative embodiment of the present invention, the broadband access gateway 808 may, for example, correspond to the broadband access gateway 218 of FIG. 2, and may store the multimedia attachment locally in storage 219 on the broadband access gateway 218, or may cause it to be stored at another location, depending upon the information in a user profile such as, for example, the user profile 235 of FIG. 2.

At some later point in time, the user of access device #1 804 may choose to end the call, and may cause message 824a to be sent to the wide area network 802. The wide area network 802 may send message 824b to the access device #2 806, that may acknowledge with message 826b. The wide area network 802 may then acknowledge the request to end the call by replying to access device #1 with messaging 826a, ending the call. Although the illustration of FIG. 8 shows the access device #1 804 originating and ending the call, a similar call scenario in accordance with a representative embodiment of the present invention may be employed when, for example, the call is ended by the called party, and when the multimedia information is sent by the called party.

At some point after the end of the call, the user of the access device #2 806 may wish to know what multimedia items have been stored on their behalf by the wide area network 802, and may cause a catalog request 828 to be sent to the designated location for multimedia storage as indicated in the user profile 235 such as, for example, the broadband access gateway 808. Upon receiving the catalog request 828, the broadband access gateway 808 may activate functionality to catalog the stored multimedia information 830, and may return a listing of the available stored multimedia information in message 832. The user of the access device 806 may then select from the listed multimedia information, and may cause messaging 834 to be sent to the broadband access gateway 808 to access selected multimedia information. The broadband access gateway 808 may then establish a communication path 838 to the access device #2 706, to deliver the selected multimedia information.

Figure 9:
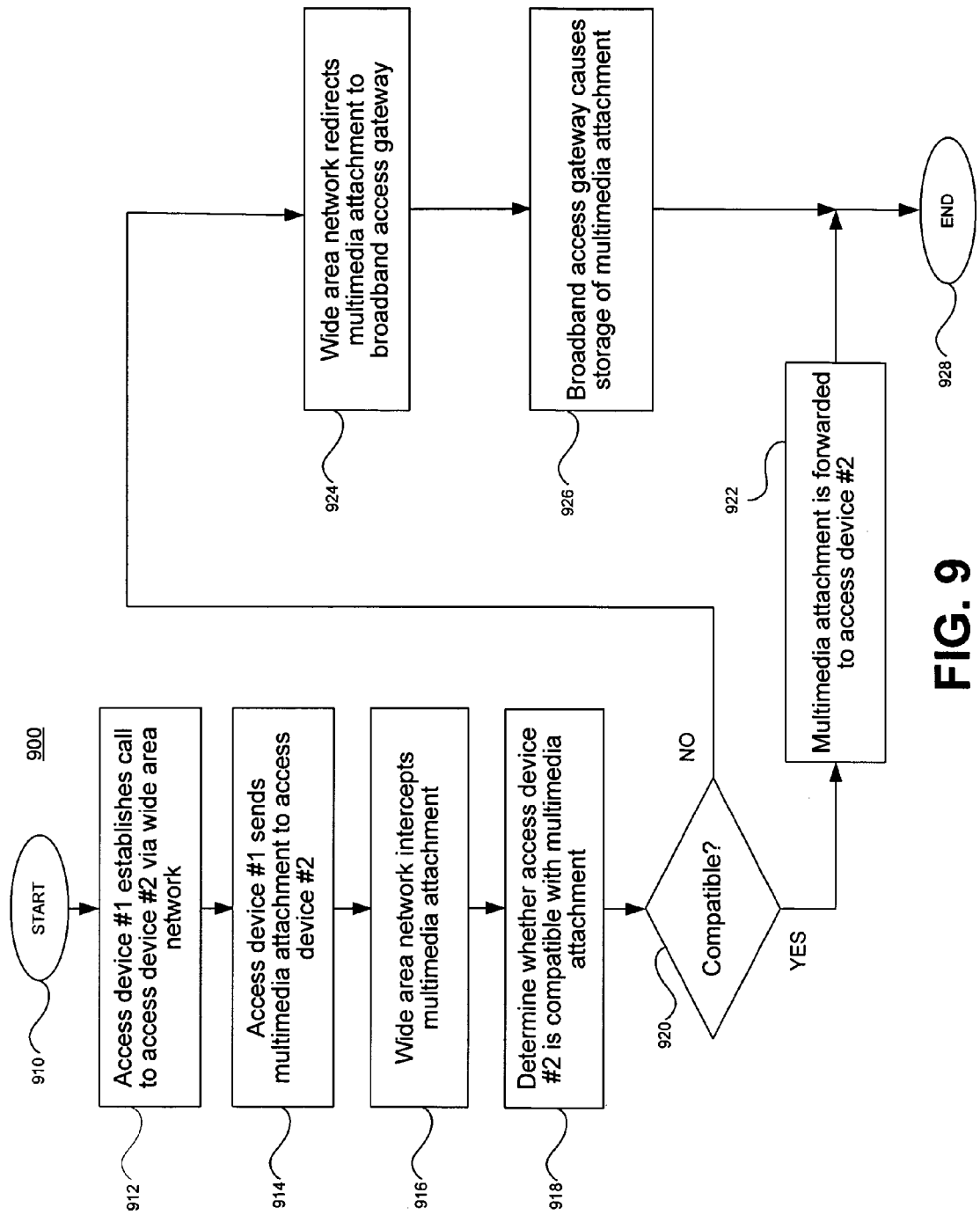
FIG. 9 is a flowchart of an exemplary method supporting handling of calls through simulcasting of multimedia information, in accordance with a representative embodiment of the present invention.

FIG. 9 is a flowchart 900 of an exemplary method supporting handling of calls through simulcasting of multimedia information, in accordance with a representative embodiment of the present invention. The following discussion makes references to the elements of FIG. 2. The method of FIG. 9 begins with a first access device such as, for example, the access device 226 in an idle state (i.e., not engaged in a call) (block 910). A call initiated by the first access device 226 is then established via a wide area network such as, for example, the GSM/EDGE/GPRS network 214 to a second access device such as, for example, the access device 224 (block 912). The first and second access devices 224, 226 may comprise any combination of, for example, a mobile multimedia handset, a wireless personal digital assistant, a laptop, or other similar devices. During the call, the first access device may send a multimedia attachment to the second access device (block 914). The multimedia attachment may comprise, for example, digitized voice, data, digitized video, still images, or other forms of digital multimedia information. In a representative embodiment of the present invention, the wide area network 214 may then intercept the multimedia attachment (block 916), and may determine whether the second access device is compatible with the multimedia attachment (block 918). If the multimedia attachment is compatible with the second access device (block 920), the multimedia attachment may be forwarded to the second access device (block 922). The method of FIG. 9 then ends (block 928). If, however, the multimedia attachment is not compatible with the second access device (block 920), the wide area network 214 may redirect the multimedia attachment to a broadband access gateway associated with the user of the second access device (block 924). Information about such an association may be contained within a user profile such as, for example, the user profile 325, or in subscriber information of the wide area network 214. The broadband access gateway may then cause the multimedia attachment to be stored in a location designated in, for example, the user profile (block 926). The method of FIG. 9 then ends (block 928).

Figure 10:
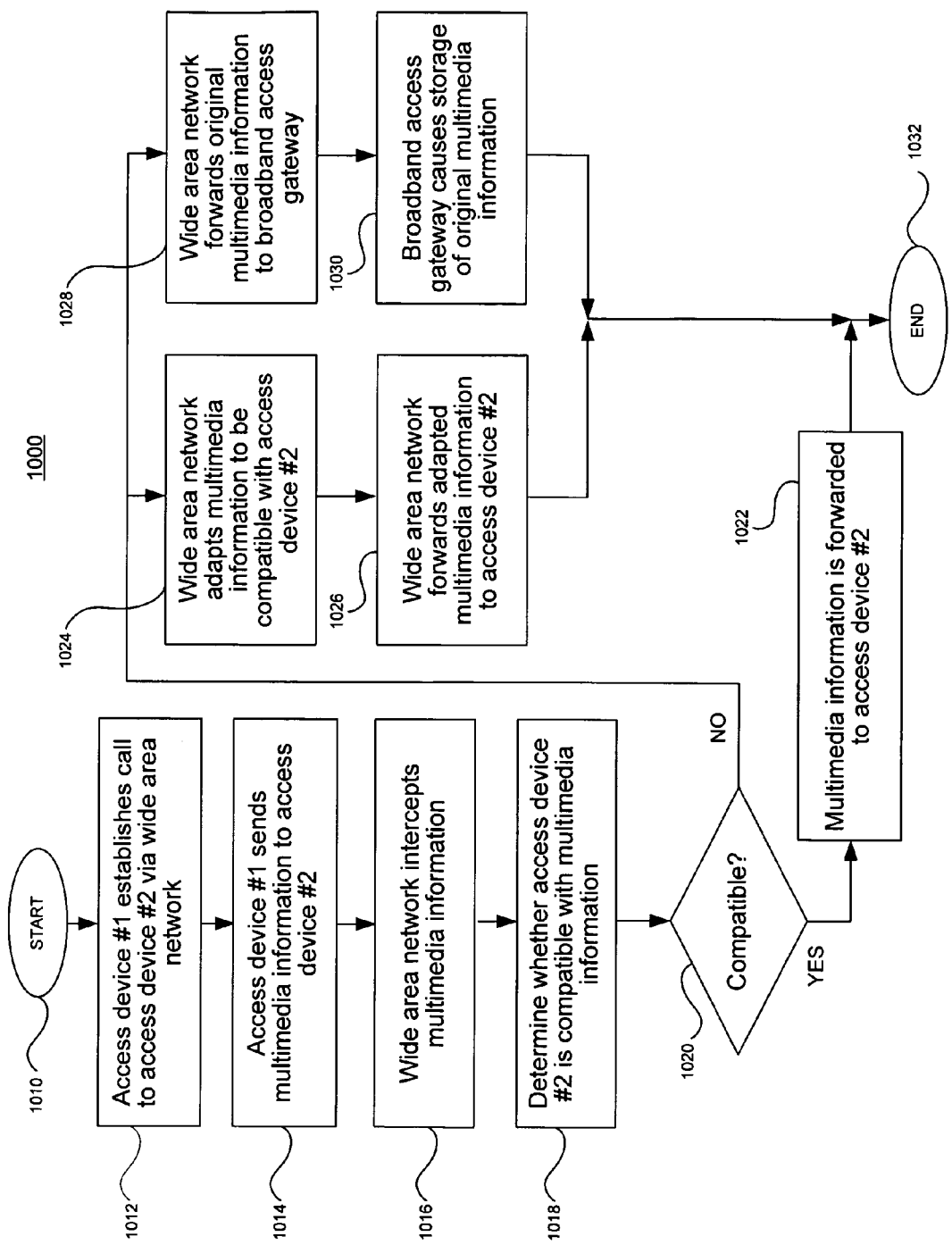
FIG. 10 is a flowchart of another exemplary method supporting handling of calls through simulcasting of multimedia information, in accordance with a representative embodiment of the present invention.

FIG. 10 is a flowchart 1000 of another exemplary method supporting handling of calls through simulcasting of multimedia information, in accordance with a representative embodiment of the present invention. The following discussion makes references to the elements of FIG. 2. The method of FIG. 10 begins with a first access device such as, for example, the access device 226 in an idle state (i.e., not engaged in a call) (block 1010). A call initiated by the first access device 226 is then established via a wide area network such as, for example, the GSM/EDGE/GPRS network 214 to a second access device such as, for example, the access device 224 (block 1012). The first and second access devices 224, 226 may comprise any combination of, for example, a mobile multimedia handset, a wireless personal digital assistant, a laptop, or other similar devices. During the call, the first access device may send multimedia information to the second access device (block 1014). The multimedia information may comprise, for example, digitized voice, data, digitized video, still images, or other forms of digital multimedia information. In a representative embodiment of the present invention, the wide area network may then intercept the multimedia information (block 1016), and may determine whether the second access device is compatible with the multimedia information (block 1018). Determination may comprise statistical analysis of the multimedia information, examination of metadata accompanying the multimedia information, or particular of the call connection, for example.

If the multimedia information is compatible with the second access device (block 1020), the intercepted multimedia information may be forwarded to the second access device (block 1022). The method of FIG. 10 then ends (block 1032). If, however, the multimedia information is not compatible with the second access device (block 1020), the wide area network may perform activities shown in FIG. 10 as two parallel paths to represent that the activities of the two paths may occur concurrently. In the left path, the wide area network may adapt the intercepted multimedia information so as to be compatible with the second access device (block 1024). Examples of such an adaptation may include transcoding to a different bit rate, a change in image spacial or color resolution, and the like. The wide area network may then forward the adapted multimedia information to the second access device (block 1026). The method of FIG. 10 then ends (block 1032).

In the right path of FIG. 10, the wide area network may forward the original intercepted multimedia information to a broadband access gateway associated with the second access device (block 1028). A broadband access gateway may be associated with an access device base upon information contained within a user profile such as, for example, the user profiles 211, 225, 235 of FIG. 2, or upon subscriber information maintained by a wide area network such as, for example, the GSM/EDGE/GPRS network 214 of FIG. 2. The broadband access gateway may then cause the original intercepted multimedia information to be stored (block 1030). The method of FIG. 10 then ends.

It should be noted that although the previous discussion makes reference to functions performed by a wireless carrier central office, other network elements may perform those functions in other arrangements in accordance with a representative embodiment of the present invention. For example, in an intelligent network (IN) environment, an applications processor (AP) or other suitable network entity may perform tasks that are described above as being performed by the MSC of a wireless carrier central office, without departing from the spirit or scope of the present invention. It should also be noted that although the previous discussion focuses primarily on the capabilities and actions of the broadband access gateways 118, 218 of FIGS. 1 and 2, respectively, the same capabilities and actions may also apply to the router 130 of FIG. 1.

Aspects of the present invention may be found in a method of handling multimedia information through multi-network simulcasting. Such a method may comprise receiving, from a first of a plurality of access devices, multimedia information designated for a second of the plurality of access devices, and determining whether the second of the plurality of access devices is compatible with the multimedia information. The method may comprise redirecting the multimedia information via at least one of a personal area network and a broadband network, if the second of the plurality of access devices is not compatible, and forwarding the multimedia information to the second of the plurality of access devices, if the second of the plurality of access devices is compatible. A representative embodiment of the present invention may comprise causing the storage of the redirected multimedia information, and notifying a user of the other of the plurality of access devices of the redirection of the multimedia information. The method may comprise establishing a call between the first and second of the plurality of access devices, and adapting multimedia information to be compatible with the second of the plurality of access devices.

In various representative embodiments of the present invention, the plurality of access devices may comprise at least one of a mobile multimedia handset, a personal digital assistant (PDA), a personal computer (PC), a computer peripheral, a digital scanner, a digital camera, a printer, headphones, and a pointing device. At least one of the receiving, redirecting, and forwarding may be performed using a wireless wide area network, and the wireless wide area network may comprise at least one of a cellular digital packet data (CDPD) network, a public switched telephone network (PSTN), and a Global System for Mobile Communication (GSM) network. The wireless wide area network may also comprise at least one of a General Packet Radio Service (GPRS) network, a short message service (SMS) network, a GSM enhanced data rates for global evolution (EDGE), a time division multiple access (TDMA) network, an integrated digital enhanced network (iDEN), a code division multiple access (CDMA) network, and a CDMA2000 1xRTT network. The personal area network may comprise at least one of a Bluetooth network, an Institute of Electrical and Electronics Engineers (IEEE) 802.11 network, and a cellular network. In various representative embodiments of the present invention, the broadband network may comprise at least one of a cable network, a digital subscriber loop network, a T1 network, a T3 network, a local multipoint distribution system (LMDS), a WiMAX network, and an Institute of Electrical and Electronics Engineers (IEEE) 802.16 network. The multimedia information may comprise at least one of streaming video, broadcast video, digitized voice, digital data, text, digitized audio, digitized still images, digitized video, and digitized music.

Yet other aspects of the present invention may be observed in a machine-readable storage, having stored thereon a computer program having a plurality of code sections executable by a machine, for causing the machine to perform the operations of the method described above.

Additional aspects of the present invention may be seen in a system supporting handling multimedia information through multi-network simulcasting. A representative embodiment of the present invention may comprise a plurality of access devices capable of communicating multimedia information via a wireless wide area network communicatively coupled to a broadband network. Such an embodiment may also comprise a gateway communicatively coupled to the broadband network and at least one wireless interface. The gateway may be capable of selectively exchanging multimedia information among at least one wireless interface and the broadband network, and of communicating with the plurality of access devices via the at least one wireless interface. The wireless wide area network may redirect multimedia information for one of the plurality of access devices based upon at least one parameter, and the gateway may be capable of causing storage of the redirected multimedia information. The redirected multimedia information may be stored within the gateway. The gateway may be capable of providing a catalog of stored multimedia information, and of adapting multimedia information to be compatible with the one of the plurality of access devices based upon the at least one parameter.

The gateway of a representative embodiment in accordance with the present invention may be capable of receiving a request for stored multimedia information from one of the plurality of access devices, and of sending the requested multimedia information to the one of the plurality of access devices. The wireless wide area network may notify the one of the plurality of access devices of the redirection. In various representative embodiments of the present invention, the multimedia information may comprise at least one of streaming video, broadcast video, digitized voice, digital data, text, digitized audio, digitized still images, digitized video, and digitized music. The broadband network may comprise at least one of a cable network, a digital subscriber loop network, a T1 network, a T3 network, a local multipoint distribution system (LMDS), a WiMAX network, and an Institute of Electrical and Electronics Engineers (IEEE) 802.16 network. The at least one wireless interface may comprise at least one of a Bluetooth network interface, an Institute of Electrical and Electronics Engineers (IEEE) 802.11 network interface, and a cellular network interface.

In a representative embodiment of the present invention, the wide area network may comprise at least one of a cellular digital packet data (CDPD) network, a public switched telephone network (PSTN), a Global System for Mobile Communication (GSM) network, and a General Packet Radio Service (GPRS) network. The wide area network may also comprise at least one of a short message service (SMS) network, a GSM enhanced data rates for global evolution (EDGE), a time division multiple access (TDMA) network, an integrated digital enhanced network (iDEN), a code division multiple access (CDMA) network, and a CDMA2000 1xRTT network. The plurality of access devices may comprise at least one of a mobile multimedia handset, a personal digital assistant (PDA), a personal computer (PC), a computer peripheral, a digital scanner, a digital camera, a printer, headphones, and a pointing device. The at least one parameter may comprise at least one of a bit rate, a bandwidth, a cost, a color resolution, a spatial resolution, a multimedia information size, and a multimedia information type.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are considerations because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of handling multimedia information through multi-network simulcasting, the method comprising:
   receiving, from a first of a plurality of access devices, multimedia information designated for a second of the plurality of access devices, wherein the multimedia information comprises streaming media;
   determining whether the second of the plurality of access devices is compatible with the multimedia information;
   redirecting the multimedia information via one or both of a personal area network and/or a broadband network, if the second of the plurality of access devices is not compatible;
   adapting non-compatible multimedia information to be compatible with the second of the plurality of access devices; and
   forwarding the multimedia information to the second of the plurality of access devices, if the second of the plurality of access devices is compatible, wherein said forwarding occurs during an active call.

2. The method according to claim 1, comprising:
   causing the storage of the redirected multimedia information.

3. The method according to claim 1, comprising:
notifying a user of the second of the plurality of access devices of the redirection of the multimedia information.

4. The method according to claim 1, comprising:
establishing a call between the first and second of the plurality of access devices.

5. The method according to claim 1 wherein the plurality of access devices comprises one or more of: a mobile multimedia handset, a personal digital assistant (PDA), a personal computer (PC), a computer peripheral, a digital scanner, a digital camera, a printer, headphones, and/or a pointing device.

6. The method according to claim 1 wherein one or more of: the receiving, redirecting, and/or forwarding is performed using a wireless wide area network.

7. The method according to claim 6 wherein the wireless wide area network comprises one or more of: a cellular digital packet data (CDPD) network, a public switched telephone network (PSTN), a Global System for Mobile Communication (GSM) network, a General Packet Radio Service (GPRS) network, a short message service (SMS) network, a GSM enhanced data rates for global evolution (EDGE), a time division multiple access (TDMA) network, an integrated digital enhanced network (iDEN), a code division multiple access (CDMA) network, and/or a CDMA2000 1xRTT network.

8. The method according to claim 1 wherein the personal area network comprises one or more of: a Bluetooth network, an Institute of Electrical and Electronics Engineers (IEEE) 802.11 network, and/or a cellular network.

9. The method according to claim 1 wherein the broadband network comprises one or more of: a cable network, a digital subscriber loop network, a T1 network, a T3 network, a local multipoint distribution system (LMDS), a WiMAX network, and/or an Institute of Electrical and Electronics Engineers (IEEE) 802.16 network.

10. The method according to claim 1 wherein the multimedia information also comprises one or more of: broadcast video, digitized voice, digital data, text, digitized audio, digitized still images, digitized video, and/or digitized music.

11. A system supporting handling multimedia information through multi-network simulcasting, the system comprising:
a plurality of access devices capable of communicating multimedia information via a wireless wide area network communicatively coupled to a broadband network, wherein the multimedia information comprises streaming media;
a gateway communicatively coupled to the broadband network and at least one wireless interface, the gateway capable of selectively exchanging multimedia information among at least one wireless interface and the broadband network, and of communicating with the plurality of access devices via the at least one wireless interface;
the wireless wide area network redirecting multimedia information for one of the plurality of access devices based upon at least one parameter, the gateway capable of adapting non-compatible multimedia information to be compatible with the one of the plurality of access devices based upon the at least one parameter; and
the gateway capable of causing storage of the redirected multimedia information.

12. The system according to claim 11 wherein the redirected multimedia information is stored within the gateway.

13. The system according to claim 11, comprising:
the gateway capable of providing a catalog of stored multimedia information.

14. The system according to claim 11, comprising:
the gateway capable of receiving a request for stored multimedia information from one of the plurality of access devices; and
the gateway capable of sending the requested multimedia information to the one of the plurality of access devices.

15. The system according to claim 11 wherein the wireless wide area network notifies the one of the plurality of access devices of the redirection.

16. The system according to claim 11 wherein multimedia information also comprises one or more of: broadcast video, digitized voice, digital data, text, digitized audio, digitized still images, digitized video, and/or digitized music.

17. The system according to claim 11 wherein the broadband network comprises one or more of: a cable network, a digital subscriber loop network, a T1 network, a T3 network, a local multipoint distribution system (LMDS), a WiMAX network, and/or an Institute of Electrical and Electronics Engineers (IEEE) 802.16 network.

18. The system according to claim 11 wherein the at least one wireless interface comprises one or more of: a Bluetooth network interface, an Institute of Electrical and Electronics Engineers (IEEE) 802.11 network interface, and/or a cellular network interface.

19. The system according to claim 11 wherein the wide area network comprises one or more of: a cellular digital packet data (CDPD) network, a public switched telephone network (PSTN), a Global System for Mobile Communication (GSM) network, a General Packet Radio Service (GPRS) network, a short message service (SMS) network, a GSM enhanced data rates for global evolution (EDGE), a time division multiple access (TDMA) network, an integrated digital enhanced network (iDEN), a code division multiple access (CDMA) network, and/or a CDMA2000 1xRTT network.

20. The system according to claim 11 wherein the plurality of access devices comprises one or more of: a mobile multimedia handset, a personal digital assistant (PDA), a personal computer (PC), a computer peripheral, a digital scanner, a digital camera, a printer, headphones, and/or a pointing device.

21. The system according to claim 11 wherein the at least one parameter comprises one or more of: a bit rate, a bandwidth, a cost, a color resolution, a spatial resolution, a multimedia information size, and/or a multimedia information type.

22. A machine-readable storage, having stored thereon a computer program having a plurality of code sections for operating a system supporting handling multimedia information through multi-network simulcasting, the code sections executable by a machine for causing the machine to perform the operations comprising:
receiving, from a first of a plurality of access devices, multimedia information designated for a second of the plurality of access devices, wherein the multimedia information comprises streaming media;
determining whether the second of the plurality of access devices is compatible with the multimedia information;
redirecting the multimedia information via one or both of: a personal area network and/or a broadband network, if the second of the plurality of access devices is not compatible;
adapting non-compatible multimedia information to be compatible with the second of the plurality of access devices; and forwarding the multimedia information to the second of the plurality of access devices, if the second of the plurality of access devices is compatible.

23. The machine-readable storage according to claim 22 wherein the code sections executable by a machine further causing the machine to perform the operations comprising: causing the storage of the redirected multimedia information.

24. The machine-readable storage according to claim 22 wherein the code sections executable by a machine further causing the machine to perform the operations comprising: notifying a user of the other of the plurality of access devices of the redirection of the multimedia information.

25. The machine-readable storage according to claim 22 wherein the code sections executable by a machine further causing the machine to perform the operations comprising: establishing a call between at least two of the plurality of access devices.

26. The machine-readable storage according to claim 22 wherein the plurality of access devices comprises one or more of: a mobile multimedia handset, a personal digital assistant (PDA), a personal computer (PC), a computer peripheral, a digital scanner, a digital camera, a printer, headphones, and/or a pointing device.

27. The machine-readable storage according to claim 22 wherein one or more of: the receiving, redirecting, and/or forwarding is performed using a wireless wide area network.

28. The machine-readable storage according to claim 27 wherein the wireless wide area network comprises one or more of: a cellular digital packet data (CDPD) network, a public switched telephone network (PSTN), a Global System for Mobile Communication (GSM) network, a General Packet Radio Service (GPRS) network, a short message service (SMS) network, a GSM enhanced data rates for global evolution (EDGE), a time division multiple access (TDMA) network, an integrated digital enhanced network (iDEN), a code division multiple access (CDMA) network, and/or a CDMA2000 1xRTT network.

29. The machine-readable storage according to claim 22 wherein the personal area network comprises one or more of: a Bluetooth network, an Institute of Electrical and Electronics Engineers (IEEE) 802.11 network, and/or a cellular network.

30. The machine-readable storage according to claim 22 wherein the broadband network comprises one or more of: a cable network, a digital subscriber loop network, a T1 network, a T3 network, a local multipoint distribution system (LMDS), a WiMAX network, and/or an Institute of Electrical and Electronics Engineers (IEEE) 802.16 network.

31. The machine-readable storage according to claim 22 wherein the multimedia information also comprises one or more of: broadcast video, digitized voice, digital data, text, digitized audio, digitized still images, digitized video, and/or digitized music.

32. A system supporting handling of multimedia information through multi-network simulcasting, the system having a plurality of access devices capable of communicating multimedia information comprising streaming media via a wireless wide area network communicatively coupled to a broadband network, the system comprising:

a gateway communicatively coupled to the broadband network and at least one wireless interface, the gateway capable of selectively exchanging multimedia information among at least one wireless interface and the broadband network, and of communicating with the plurality of access devices via the at least one wireless interface;

the gateway capable of adapting non-compatible multimedia information to be compatible with one of the plurality of access devices based upon at least one parameter, the at least one parameter supporting redirection by the wireless wide area network of multimedia information for the one of the plurality of access devices; and the gateway capable of causing storage of the redirected multimedia information.

33. The system according to claim 32 wherein the redirected multimedia information is stored within the gateway.

34. The system according to claim 32 wherein the gateway is capable of providing a catalog of stored multimedia information.

35. The system according to claim 32 wherein the gateway is capable of receiving a request for stored multimedia information from one of the plurality of access devices, and wherein the gateway is capable of sending the requested multimedia information to the one of the plurality of access devices.

36. The system according to claim 32 wherein the wireless wide area network notifies the one of the plurality of access devices of the redirection.

37. The system according to claim 32 wherein multimedia information also comprises one or more of: broadcast video, digitized voice, digital data, text, digitized audio, digitized still images, digitized video, and/or digitized music.

38. The system according to claim 32 wherein the broadband network comprises one or more of: a cable network, a digital subscriber loop network, a T1 network, a T3 network, a local multipoint distribution system (LMDS), a WiMAX network, and/or an Institute of Electrical and Electronics Engineers (IEEE) 802.16 network.

39. The system according to claim 32 wherein the at least one wireless interface comprises one or more of: a Bluetooth network interface, an Institute of Electrical and Electronics Engineers (IEEE) 802.11 network interface, and/or a cellular network interface.

40. The system according to claim 32 wherein the wide area network comprises one or more of: a cellular digital packet data (CDPD) network, a public switched telephone network (PSTN), a Global System for Mobile Communication (GSM) network, a General Packet Radio Service (GPRS) network, a short message service (SMS) network, a GSM enhanced data rates for global evolution (EDGE), a time division multiple access (TDMA) network, an integrated digital enhanced network (iDEN), a code division multiple access (CDMA) network, and/or a CDMA2000 1xRTT network.

41. The system according to claim 32 wherein the plurality of access devices comprises one or more of: a mobile multimedia handset, a personal digital assistant (PDA), a personal computer (PC), a computer peripheral, a digital scanner, a digital camera, a printer, headphones, and/or a pointing device.

42. The system according to claim 32 wherein the at least one parameter comprises one or more of: a bit rate, a bandwidth, a cost, a color resolution, a spatial resolution, a multimedia information size, and/or a multimedia information type.

* * * * *